US006738962B1

(12) United States Patent
Flaherty et al.

(10) Patent No.: US 6,738,962 B1
(45) Date of Patent: May 18, 2004

(54) CONFIGURATION AND/OR RECONFIGURATION OF INTEGRATED CIRCUIT DEVICES THAT INCLUDE PROGRAMMABLE LOGIC AND MICROPROCESSOR CIRCUITRY

(75) Inventors: Edward Flaherty, Kingston Bagpuize (GB); Mark Dickinson, Brill (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 09/879,303

(22) Filed: Jun. 12, 2001

Related U.S. Application Data

(60) Provisional application No. 60/211,094, filed on Jun. 12, 2000.

(51) Int. Cl.[7] ................................................. G06F 17/50
(52) U.S. Cl. ........................................... 716/17; 716/18
(58) Field of Search .............................. 716/17, 18, 16; 375/130, 222; 717/139; 709/230, 249; 710/8, 30, 305, 310

(56) References Cited

U.S. PATENT DOCUMENTS

| 5,432,719 | A |   | 7/1995  | Freeman et al. ............ 364/579 |
| 5,703,759 | A |   | 12/1997 | Trimberger ................. 361/777 |
| 5,781,756 | A |   | 7/1998  | Hung ......................... 395/430 |
| 5,787,007 | A |   | 7/1998  | Bauer ......................... 364/489 |
| 5,949,987 | A | * | 9/1999  | Curd et al. ................... 716/16 |
| 6,046,603 | A |   | 4/2000  | New ............................ 326/38 |
| 6,054,871 | A |   | 4/2000  | New ............................ 326/39 |
| 6,085,317 | A |   | 7/2000  | Smith .......................... 713/1  |
| 6,215,326 | B1 |  | 4/2001  | Jefferson et al. .............. 326/41 |
| 6,307,877 | B1 | * | 10/2001 | Philips et al. ............... 375/130 |
| 6,408,432 | B1 | * | 6/2002  | Herrmann et al. .......... 717/139 |
| 6,628,656 | B1 | * | 9/2003  | Raza ....................... 370/395.4 |

OTHER PUBLICATIONS

F. Zlotnick, et al., "A High Performance Fine–Grained Approach To SRAM Based FPGAs", Wescon '93 Conference Record, Sep. 28–30, 1993, pp. 321–326.*
Jonathan Rose, et al., "Architecture Of Field–Programmable Gate Arrays", Proceedings of The IEEE, vol. 81, No. 7, pp. 1014–1041, Jul. 1993.*
A. McKenzie et al., "A Versatile Application Bootload for Field Programmable SOC", Technical Developments, Motorola, Inc., Schaumburg, IL, vol. 39, Sep. 1999, pp. 77–79.
R. May et al., "FPGA Configuration Data Manipulation", Technical Developments, Motorola, Inc., Schaumburg, IL, vol. 39, Sep. 1999, p. 80.

* cited by examiner

*Primary Examiner*—Vuthe Siek
*Assistant Examiner*—Naum Levin
(74) *Attorney, Agent, or Firm*—Fish & Neave; Robert R. Jackson; Garry J. Tuma

(57) ABSTRACT

An integrated circuit includes programmable logic circuitry and control circuitry that is operable to enable the integrated circuit to make a connection to an external source of data for configuring the programmable logic circuitry. The integrated circuit may include dedicated communications port circuitry that can be used in making the above-mentioned connection, or the programmable logic circuitry itself can be configured for operation as communications port circuitry for use in making the connection. The programmable logic circuitry may be configured any number of times.

41 Claims, 5 Drawing Sheets

CONFIGURATION AND/OR RECONFIGURATION OF INTEGRATED CIRCUIT DEVICES THAT INCLUDE PROGRAMMABLE LOGIC AND MICROPROCESSOR CIRCUITRY

This application claims the benefit of U.S. provisional patent application No. 60/211,094, filed Jun. 12, 2000, which is hereby incorporated by reference herein in its entirety.

BACKGROUND OF THE INVENTION

This invention relates to integrated circuit devices, and more particularly to integrated circuit devices that include both programmable logic and microprocessor circuitry or capabilities.

Programmable logic integrated circuit devices are well known, as is shown, for example, by Jefferson et al. U.S. Pat. No. 6,215,326. Consideration is now being given to various ways of combining programmable logic circuitry, microprocessor-type circuitry, and possibly other types of circuitry on a single integrated circuit to provide even more powerful devices.

SUMMARY OF THE INVENTION

In one aspect of the present invention, an integrated circuit includes programmable logic circuitry and circuitry configured to initiate a connection between the integrated circuit and an external source of data for configuring the programmable logic circuitry. The circuitry that is in addition to the programmable logic circuitry may include processor circuitry, external signaling circuitry, non-volatile memory circuitry, re-writable memory circuitry, and interconnection bus circuitry. In addition to other possible uses, some or all of the circuitry on the integrated circuit that is in addition to the programmable logic circuitry is typically used to control at least some aspects of configuration of the programmable logic circuitry. The same may additionally or alternatively be true for subsequent reconfiguration of the programmable logic circuitry, assuming that the programmable logic circuitry is reconfigurable. The programmable logic circuitry itself may be used as a temporary communications port for allowing the integrated circuit to receive the data that will later be used to further configure or reconfigure the programmable logic circuitry.

In another aspect of the invention, methods of operating integrated circuits of the type described above are provided. In particular, the operating methods of the invention are for configuring and/or reconfiguring the programmable logic circuitry of the above-mentioned integrated circuits. For example, when the integrated circuit is started, the processor circuitry may be booted up and may then use the external signaling circuitry to bring in data for use in configuring the programmable logic circuitry. This configuration data may need buffering and/or other processing such as decompression and/or decryption. The processor circuitry may control such operations as temporarily storing the data in memory circuitry on the integrated circuit, decompressing and/or decrypting the data, and then using the data to configure the programmable logic circuitry. An initial configuration of the programmable logic circuitry may enable that circuitry to at least temporarily operate as more sophisticated external signaling circuitry, via which other configuration data can be brought into the integrated circuit. This other configuration data can then be used to further configure or reconfigure the programmable logic circuitry. Assuming that the programmable logic circuitry is reconfigurable, procedures similar to those described above can be used to reconfigure the programmable logic circuitry whenever desired.

Further features of the invention, its nature and various advantages will be more apparent from the accompanying drawings and the following detailed description.

DETAILED DESCRIPTION

Figure 1:
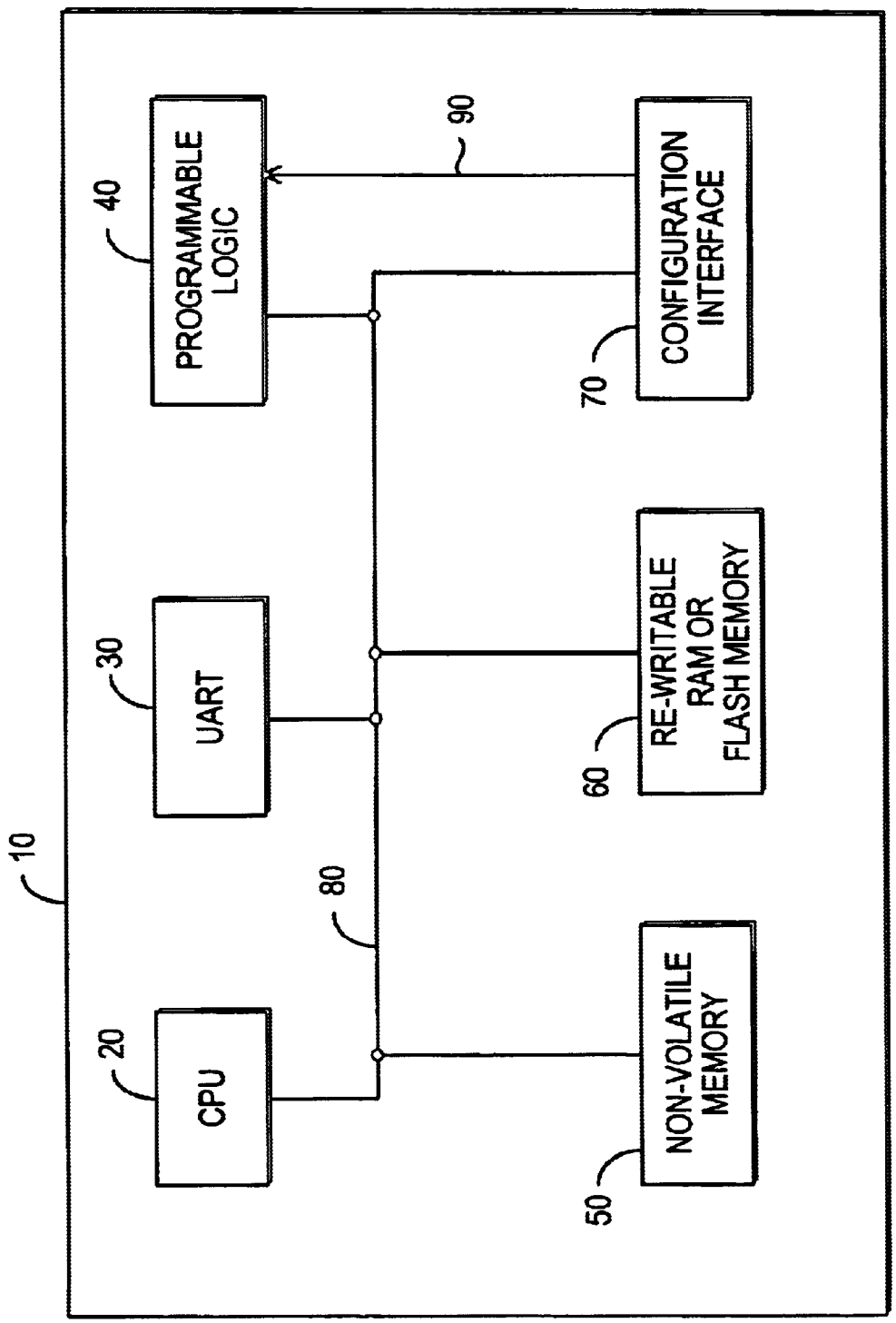
FIG. 1 is a simplified block diagram of an illustrative embodiment of circuitry constructed in accordance with the invention.

An illustrative embodiment of an integrated circuit device ("IC") 10 constructed in accordance with the invention is shown in FIG. 1. IC 10 includes microprocessor circuitry 20, universal asynchronous receiver/transmitter ("UART") circuitry 30, programmable logic ("PLD") circuitry 40, non-volatile memory circuitry 50, re-writable memory circuitry 60, and configuration interface circuitry 70. The various portions of the circuitry on IC 10 are interconnected by system bus circuitry 80 on the IC. Configuration interface circuitry 70 (which can be per se conventional circuitry for applying configuration data to PLD 40 in the form required to cause that data to configure the PLD) may have additional connections 90 to PLD 40 that are dedicated to applying PLD-configuring signals to the PLD.

It will be understood that FIG. 1 is quite simplified. For example, the details of each of circuit portions 20, 30, 40, 50, 60, 70, 80, and 90 are not shown because they can be individually well known to those skilled in the art. It may be helpful to mention, however, that although they are not shown separately in FIG. 1, input/output ("I/O") pins are included on IC 10 for use in making connections to external circuitry. For example, such I/O pins may be connected more or less directly to system bus 80, and/or I/O pins may be provided as part of external signaling circuitry 30 and/or PLD 40. It will also be understood that certain of the elements shown in FIG. 1 as part of IC 10 may alternatively be provided in circuitry separate from IC 10. For example, nonvolatile memory 50 may be provided on a separate integrated circuit device. However, at least most of the circuitry shown in FIG. 1 is preferably provided on IC 10. As still another illustration of variations within the scope of the invention, UART 30 is only one example of dedicated external signaling circuitry that can be provided on IC 10. If desired, UART 30 can be replaced by any other suitable communications port circuitry. As just one example of this, UART 30 can be replaced by per se conventional Ethernet media access controller ("MAC") circuitry.

In very general terms, there are two ways that IC 10 can be configured and/or reconfigured in accordance with the invention. The first of these ways may be referred to as the "hard-logic" way. The second way may be referred to as the "soft-logic" way. The hard-logic way will be described first. Then the soft-logic way will be described.

In the hard-logic use of IC 10, UART 30 (or whatever other dedicated communications port circuitry is provided on IC 10) is the sole or at least the primary means by which IC 10 receives data for use in configuring and/or reconfiguring PLD 40. This version of use of IC 10 is therefore referred to as the hard-logic version because dedicated (i.e., hard-wired) communications port circuitry is used so extensively and possibly exclusively in PLD configuration and/or reconfiguration.

In typical hard-logic mode operation, non-volatile memory 50 (whether on-board IC 10 as shown in FIG. 1 or separate from IC 10 as in one of the above-mentioned alternatives) stores the start-up or "boot" software required to at least initiate communication via UART 30. (As used herein, the term "software" refers not only to executable instructions, but also to data (e.g., data that some of the software instructions may need for execution or that some of the circuitry may need for desired operation). The term "data" may overlap with the term "software," and it is not a intended that these terms have rigorously, mutually exclusive meanings.) If desired, the boot software in memory 50 may additionally be sufficient to more extensively manage communication via UART 30 and to manage configuration of PLD 40. Assuming the more extensive boot software case, when IC 10 is started, the boot software from non-volatile memory 50 is loaded (as appropriate and via system bus 80) into any or all of processor or CPU 20, UART 30, and configuration interface 70. Under control of the boot software, UART 30 makes a connection to any suitable and desired source of PLD configuration data (and possibly other data and/or software as well). For example, this connection may be a relatively local and direct connection to one or more nearby devices and/or systems such as a memory device or a computer including a memory, or the connection may be a longer-distance modem-type connection via a telephone-type communication link to a more distant device or system. By way of further illustration, the connection made via UART 30 may be to an Internet website that will supply data for configuring PLD 40. Typically at least some addressing and/or switching is required to make the desired connection via UART 30. It is also typical that the connection made via UART 30 is to a selected one of any of several possible external data sources. Software and circuitry on IC 10 may be involved in making and/or effecting that selection.

When UART 30 has made the desired connection, IC 10 receives data for configuring PLD 40 via that connection. Any of several methodologies may be employed for using the data to configure the PLD. For example, it may be possible to stream the data directly into PLD 40, possibly under the control of or via configuration interface 70. Alternatively, it may be necessary to first load the PLD configuration data into re-writable memory 60 acting as a buffer. Thereafter, the configuration data may be transferred from memory 60 to PLD 40, again possibly under the control of or via configuration interface 70. As still another possibility, the PLD configuration data may be encrypted and/or compressed, and it may first be loaded into memory 60 in the form in which it is received. Thereafter, CPU 20 may operate on the data to decrypt and/or decompress it for use in configuring PLD 40, once again possibly under the control of or via configuration interface 70.

This last example is just one illustration of how CPU 20 may further cooperate with other elements on IC 10 to aid in configuring PLD 40. To do this CPU 20 may be operating on part of the boot software from non-volatile memory 50. Alternatively, the boot software from memory 50 may be more limited and generally only sufficient to enable CPU 20 to help ART 30 establish its initial communications link. CPU 20 may thereafter receive additional data and/or software via that communications link that helps the CPU further manage the PLD 40 configuration operation. For example, CPU 20 may receive variable decryption and/or decompression key data and/or software to help CPU 20 decrypt and/or decompress PLD 40 configuration data also received via the communications link. As another illustration, CPU 20 may receive data via an initial UART 30 communications link that helps or enables CPU 20 to manage UART 30 to establish another, different communications link, via which it is desired for IC 10 to receive data for configuring PLD 40. Any communications link established via UART 30 may also be the means by which additional data and/or software is loaded into IC 10 for use during and/or control of post-PLD-configuration operations of the IC. For example, such additional data and/or software may be loaded into re-writable memory 60 and subsequently used and/or executed by CPU 20.

After any desired data and/or software has been received via the UART 30 communications link, that link may be broken, or it may remain unbroken if desired. PLD 40 is configured using the PLD-configuring data that was received, and then "normal"(post-PLD-configuration) operation of IC 10 may begin. As still another alternative, during normal operation of IC 10, UART 30 may be used to provide one or more different communications links for use by or with the IC.

If PLD 40 is reconfigurable and it is desired to reconfigure the PLD using this invention, then such reconfiguration may be initiated in any of several ways. For example, a real-time clock (which may be part of or associated with CPU 20) may trigger reconfiguration at predetermined real-time intervals. As another example, a particular event detected (e.g., by CPU 20 and/or PLD 40) may trigger a reconfiguration. As still another example, reconfiguration may be triggered by a signal received via UART 30 or one or more I/O pins of IC 10.

When reconfiguration is triggered, the above-described boot software is again read from non-volatile memory 50 and used as described earlier in connection with configuration to produce a reconfiguration of PLD 40. This may include causing UART 30 to again establish a communications link, or this step can be omitted if the desired communications link via UART 30 is still intact. Any of the various options described earlier in connection with configuration are again options during reconfiguration. In particular, earlier-described tasks ancillary to configuration of PLD 40 may also be performed in conjunction with reconfiguration. Examples of such ancillary tasks include PLD configuration data buffering, decompression, and/or decryption. After PLD 40 has been reconfigured, post-PLD-configuration (i.e., "normal") operation of IC 10 may follow as described above in connection with initial configuration of the IC.

As has been mentioned, UART 30 is just one example of the possible hard-wired, dedicated communications ports that may be included on IC 10 for use as described above in the hard-logic mode of operating the IC to configure and/or reconfigure PLD 40. A different type of hard-wired communications port (e.g., an Ethernet MAC) may be substituted for UART 30 or may be used in addition to UART 30. For example, if both UART 30 and a more sophisticated hard-wired communications port are provided on IC 10, UART 30 may be used to provide an initial external communications link. That link may then be used to enable IC 10 to receive data and/or software for enabling the more sophisticated, hard-wired communications port to operate and establish another external communications link. The PLD 40 configuration data may then be received by IC 10 via this second communications link.

Turning now to the soft-logic mode of operating IC 10 to configure and/or reconfigure PLD 40, PLD 40 itself is preliminarily configured as a communications port for use as at least the primary means by which IC 10 receives data for producing a "final" configuration or reconfiguration of the PLD. (In this case "final configuration or reconfiguration" just means a configuration that PLD 40 will have for post-configuration, normal operation. It does not necessarily rule out subsequent reconfiguration of PLD 40.) The data for preliminarily configuring PLD 40 as a communications port may come from any of several sources. For example, it may be part of the boot software (as mentioned earlier in the discussion of the hard-logic mode of operation) from non-volatile memory 50. Alternatively, the boot software may enable UART 30 to make a connection to external circuitry, which then supplies to IC 10 the data for preliminarily configuring PLD 40 as a communications port. In either of the above cases, the preliminary configuration data may be streamed directly into PLD 40 (e.g., via configuration interface 70) or it may first require buffering, decompression, and/or decryption, which can be managed or performed by CPU 20 (with temporary storage of the data in re-writable memory 60) as was described above for the hard-logic mode. In this way PLD 40 is preliminarily configured as any desired type of communications port. As just one example, PLD 40 may be configured as an Ethernet MAC.

After PLD 40 has thus been preliminarily configured as a communications port, IC 10 uses that port to establish a communications link to an external source of data for producing a final configuration of PLD 40. This communications link may be any type of link that preliminarily configured PLD 40 is capable of making. For example, the communications link may be a local or remote link, and it may be established by PLD 40 operating wholly or partly under the control of CPU 20. The software that CPU 20 operates on at this time may be part of the above-mentioned boot software, or it may have been received via UART 30 with the data for preliminarily configuring PLD 40. As a specific illustration of the type of communications link that PLD 40 may establish, this communications link may be to an Internet website that is capable of supplying data for giving PLD 40 its final configuration.

When the desired communications link has been established via PLD 40, IC 10 receives new configuration data for PLD 40 via that link. So as not to interfere with the PLD 40 communications link, the new configuration data is preferably not immediately used by the PLD. Instead, PLD 40 preferably passes the new configuration data on to re-writable memory 60. Thus, as for other PLD configuration data described earlier, the new configuration data may be received by IC 10 in compressed and/or encrypted form.

After all desired new configuration data has been received and stored in re-writable memory 60, IC 10 can begin to use that data to give PLD 40 its desired new configuration. This operation is typically controlled by CPU 20 and may take any of several forms. For example, if the new configuration data in memory 60 has suitable form, it may be streamed directly into PLD 40 (typically via configuration interface 70). Alternatively, if the new configuration data in memory 60 requires decompression and/or decryption, that may be performed by CPU 20 as the data is retrieved from memory 60 and sent to PLD 40 (e.g., via configuration interface 70). Reconfiguring PLD 40 using the new configuration data typically wipes out the preliminary configuration of PLD 40 as a communications port. (It will be appreciated, however, that the new configuration data for PLD 40 can (if desired) include communications port data that again gives PLD 40 communications port capabilities, typically combined with other programmable logic capabilities.) IC 10 is now ready for what is elsewhere referred to herein as post-configuration, normal operation and use.

From the foregoing it will be better understood and appreciated why this mode of operation is referred to as the soft-logic mode. It is because PLD 40 itself is the primary means by which IC 10 receives the data required for configuring the PLD (at least to its final configuration). Dedicated (i.e., hard-wired) communications circuitry on IC 10 is not the primary means of communicating PLD configuration data to the IC. Instead, configurable or "soft" circuitry (i.e., PLD 40) is the primary PLD configuration data communication pathway. After the desired PLD configuration data has been received via that pathway, that pathway may be effectively erased by giving PLD 40 the desired new configuration.

Because in at least the soft-logic version PLD 40 is necessarily reconfigurable (i.e., from the preliminary to the final configuration), the invention can additionally or alternatively be used to still further reconfigure PLD 40 (e.g., from one final configuration to another, different final configuration). This can be done as will now be described.

Reconfiguration may be triggered or initiated by any of the circumstances or in any of the ways that are described above in connection with reconfiguration in the hard-logic mode. If the starting final configuration of PLD 40 includes communications port capabilities, those capabilities may be used to establish or employ an external communications link to an external source of new PLD 40 configuration data. Then (in what can be essentially a repetition of what is described earlier) that link is used to allow IC 10 to receive and store in re-writable memory 60 the new configuration data. After the new configuration data has been received, it is used to reconfigure PLD 40. CPU 20 may be involved (as described earlier) in controlling or otherwise assisting in these operations. When PLD 40 is thus newly reconfigured, IC 10 may revert to post-configuration, normal operation making use of the new PLD 40 configuration.

If prior to a requirement for reconfiguring PLD 40, the PLD does not already have appropriate communications port capabilities, the PLD must first be reconfigured to give it such capabilities. This can be done in any of several ways (like the ways described earlier for preliminarily configuring PLD 40 as a communications port). For example, communications port configuration data can come from non-volatile memory 50, or it can be received by IC 10 from an external source via UART 30. These operations can be controlled by CPU 20, and (as has been said) can include such earlier-described features as use of re-writable memory 60 and configuration interface 70, configuration data decompression, configuration data decryption, etc.

When PLD 40 has been configured as a communications port, it can be used to establish a communications link to an external source of new configuration data for PLD 40. This is again a repetition of what is described earlier and therefore typically includes initial receipt and temporary storage of the new configuration data by re-writable memory 60. Also as stated earlier, control by CPU 20 may be employed.

When the desired new configuration data has been received by IC 10 and stored in memory 60, the IC is ready to use that data to reconfigure PLD 40. This can again be done as described earlier (e.g., under control of CPU 20 via configuration interface 70 and may involve configuration data decompression and/or decryption). This operation wipes out the temporary configuration of PLD 40 as a communications port (although, again, the new final configuration of PLD 40 may include communications port capabilities). After PLD 40 has thus been reconfigured, IC 10 may again return to post-configuration, normal operation, making use of PLD 40 with its new configuration.

Figure 2:
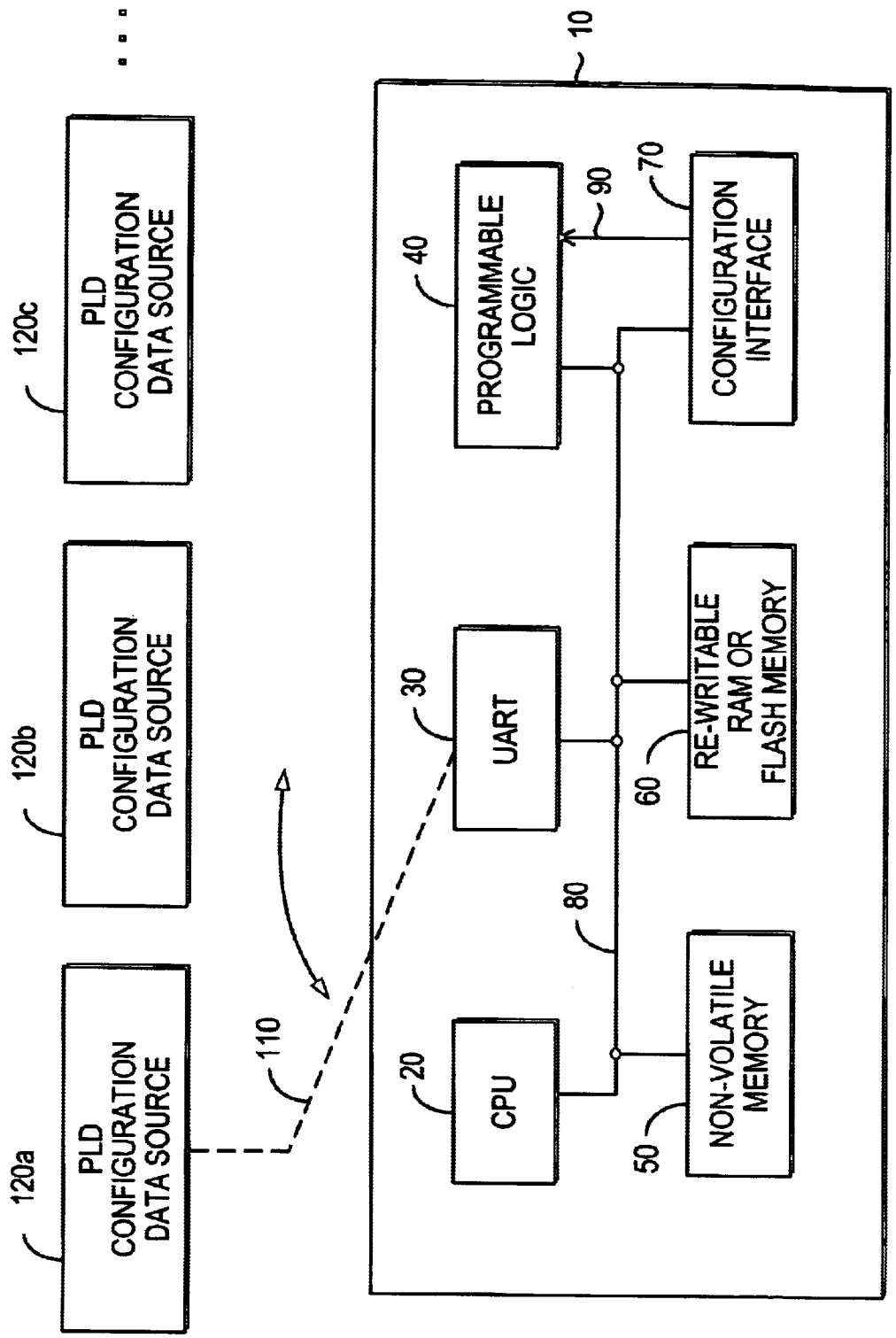
FIG. 2 is a simplified block diagram showing an illustrative configuration of use of the FIG. 1 circuitry with other circuitry in accordance with the invention.

For completeness, FIG. 2 shows IC 10 again in its hard-logic mode of operation. Dotted line 110 represents the above-described external communications link via UART 30 to an external source 120a of configuration data for PLD 40. Communications link 110 (and other generally similar external communications links in other FIGS.) is shown in dotted line form to indicate that it may only be established when needed. FIG. 2 also shows that other external sources 120b, 120c, etc., of PLD 40 configuration data may be provided, and communications link 110 may be alternatively established to any of those sources at various times. Thus communications link 110 is typically an addressable and/or switchable communications link to any selectable one of a plurality of possible sources 120. As has been said, data and software in IC 10 may be used by the IC (especially by CPU 20) to control how communications link 110 is routed and which source 120 of configuration data is selected for use.

Figure 3:
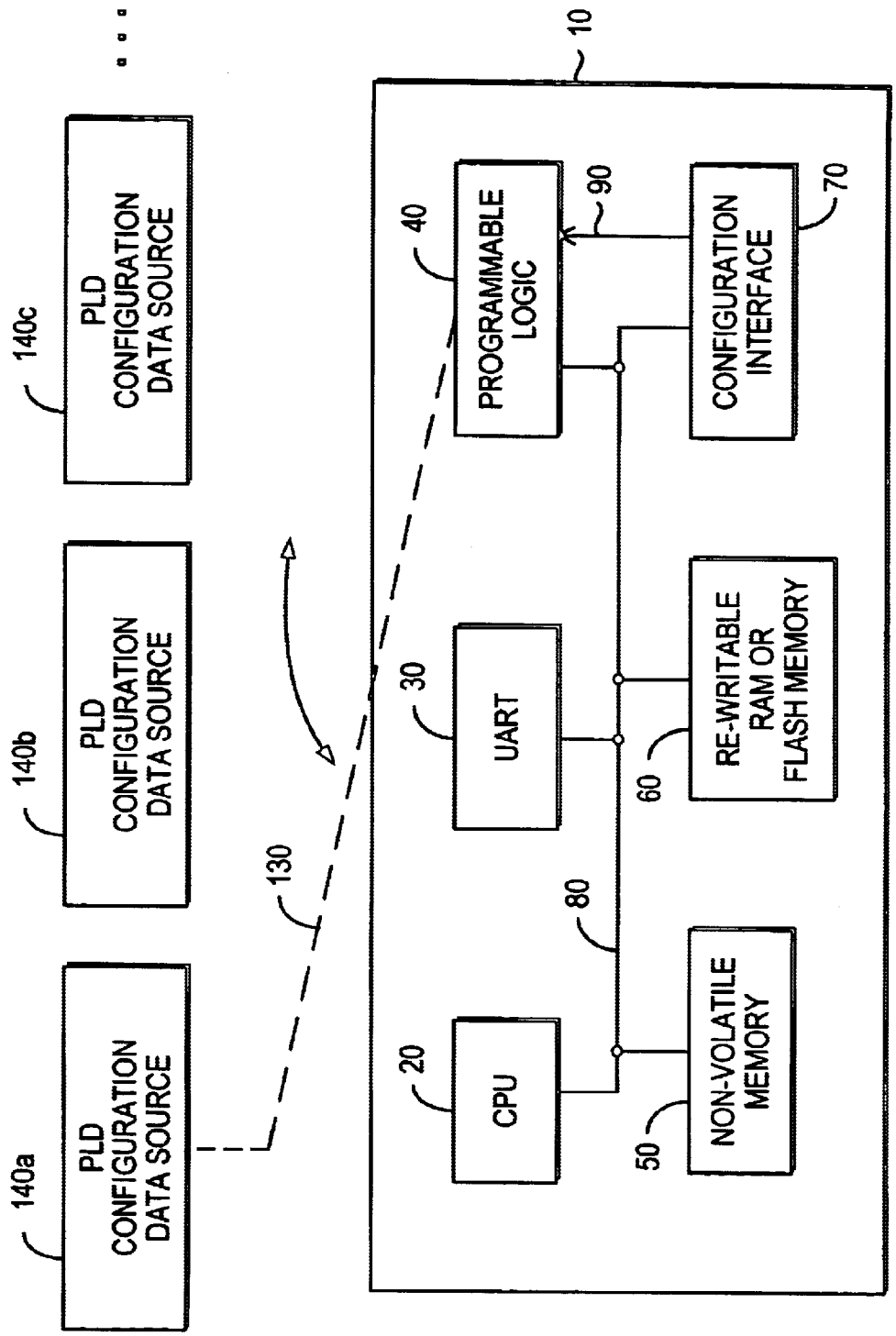
FIG. 3 is a simplified block diagram showing another illustrative configuration of use of the FIG. 1 circuitry with other circuitry in accordance with the invention.

FIG. 3 is similar to FIG. 2 but illustrates IC 10 in a soft-logic mode of operation. Dotted line 130 represents the above-described external communications link via PLD 40 to an external source 140a of configuration data for PLD 40. Communications link 130 (like link 110 in FIG. 2) is shown in dotted line form to indicate that it may only be established when needed. FIG. 3 also shows that other external sources 140b, 140c, etc., of configuration data for PLD 40 may be provided, and communications link 130 may be alternatively established to any of these sources at various times. As has been said, data and software in IC 10 may be used by the IC (especially by CPU 20) to control how communications link 130 is routed (e.g., using addressing and/or switching) and which source 140 of configuration data is selected for use.

Figure 4:
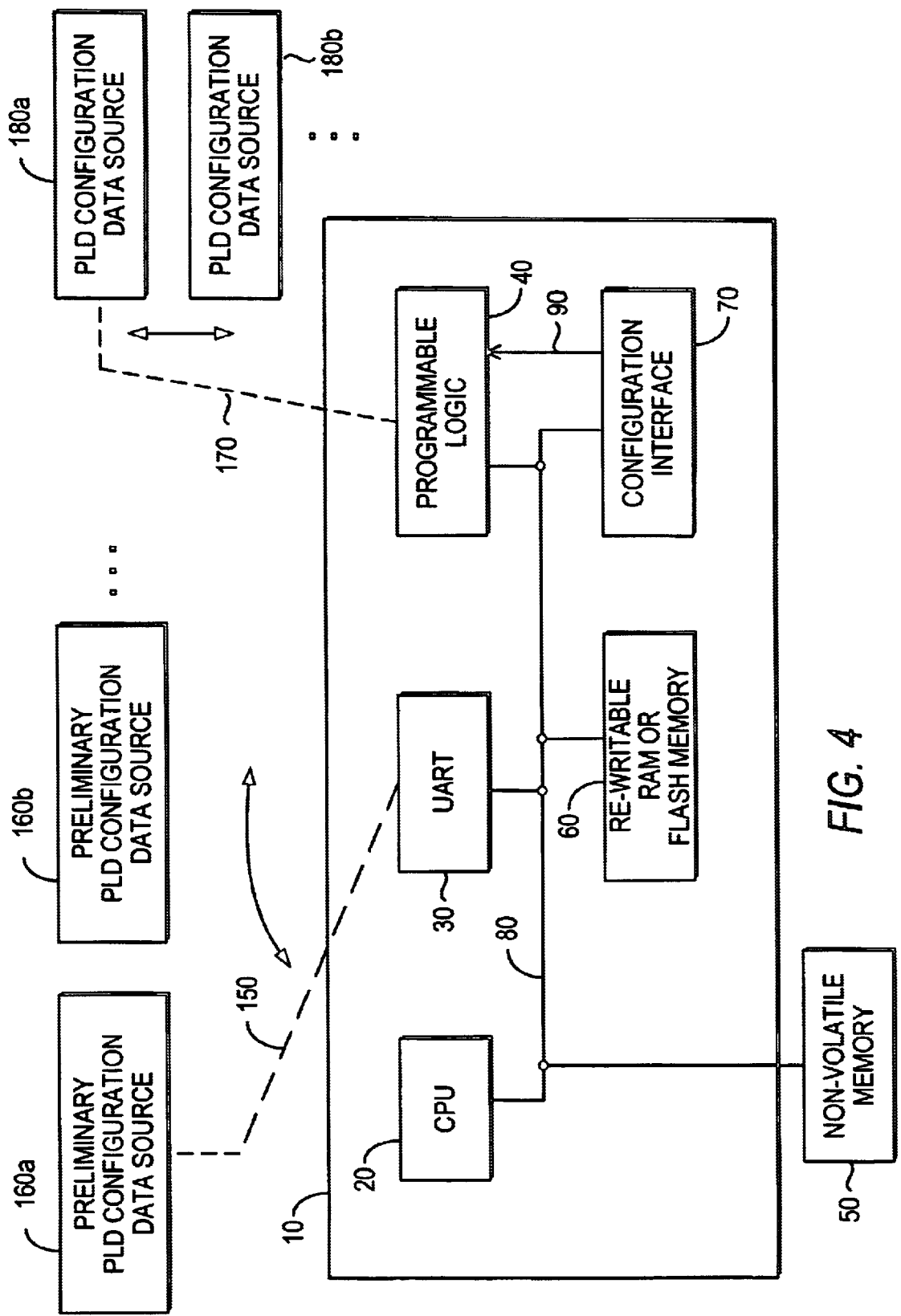
FIG. 4 is a simplified block diagram showing still another illustrative configuration of use of circuitry of the general type shown in FIG. 1 with other circuitry in accordance with the invention.

FIG. 4 is similar to FIG. 3 and further illustrates a soft-logic mode of operation of IC 10. FIG. 4 shows that UART 30 (or whatever other hard-wired communications port circuitry is provided on IC 10) can be used to establish a communications link 150 to any of several sources 160a, 160b, etc., of data for preliminarily configuring PLD 40 as a further communications port. After PLD 40 has thus been preliminarily configured, PLD 40 can be used to establish communications link 170 to any of several sources 180a, 180b, etc., of data for use in giving PLD 40 its final configuration. FIG. 4 also illustrates the point that non-volatile memory 50 can be circuitry separate from IC 10.

Figure 5:
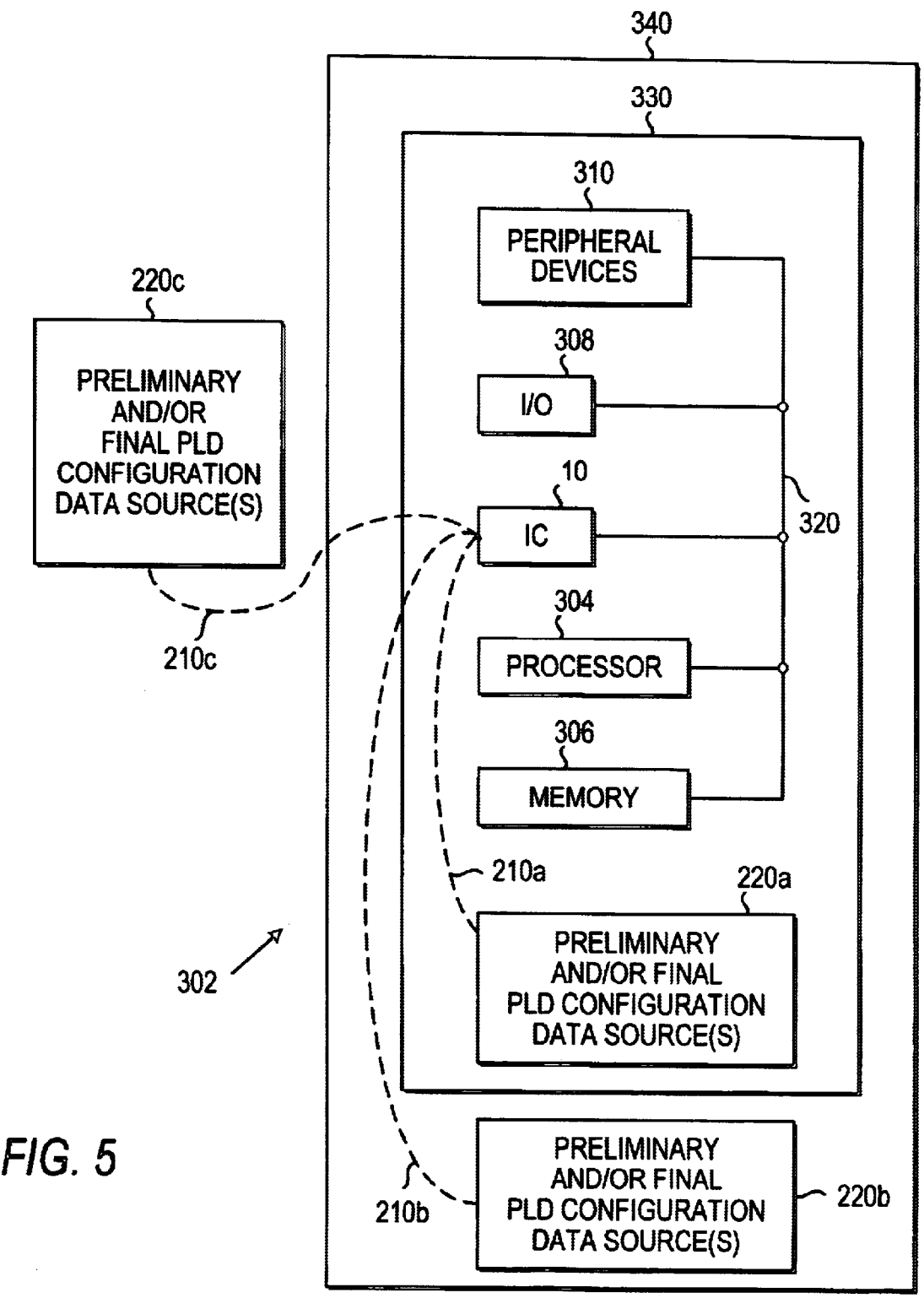
FIG. 5 is a simplified block diagram of an illustrative system employing an integrated circuit in accordance with the invention.

FIG. 5 illustrates an IC 10 of this invention in a data processing system 302. Data processing system 302 may include one or more of the following components: a processor 304; memory 306; I/O circuitry 308; and peripheral devices 310. These components are coupled together by a system bus 320 and are populated on a circuit board 330 which is contained in an end-user system 340.

System 302 can be used in a wide variety of applications, such as computer networking, data networking, instrumentation, video processing, digital signal processing, or any other application where the advantage of using programmable or reprogrammable logic is desirable. IC 10 can be used to perform a variety of different logic functions. For example, IC 10 can be configured as a processor or controller that works in cooperation with processor 304. IC 10 may also be used as an arbiter for arbitrating access to a shared resource in system 302. In yet another example, IC 10 can be configured as an interface between processor 304 and one of the other components in system 302. It should be noted that system 302 is only exemplary, and that the true scope and spirit of the invention should be indicated by the following claims.

FIG. 5 also shows that sources 220a, 220b, and 220c of data for giving the PLD portion of IC 10 a preliminary and/or final configuration can be located in any or all of several places relative to system 302. For example, such source(s) 220a can be located on printed circuit board 330. Alternatively or additionally, such source(s) 220b can be located off printed circuit board 330 but still within end-user system 340. As still another alternative or addition, source(s) 220c can be located outside end-user system 340 and even remotely from that system, if desired. IC 10 can make communications links 210a, 210b, and/or 210c to any of sources 220 as described earlier for communications links such as 110, 130, 150, and/or 170. IC 10 in FIG. 5 can be operated in either the hard-logic or soft-logic modes.

It will be understood that the foregoing is only illustrative of the principles of the invention, and that various modifications can be made by those skilled in the art without departing from the scope and spirit of the invention. For example, UART 30 is only one illustration of the type of hard-wired communications port that can be provided on IC 10. As another example of possible modifications, an Ethernet MAC is only one illustration of the type of communications port that the PLD portion of IC 10 can be configured to function as in soft-logic mode. In addition to providing PLD configuring data, any of external sources like 120, 140, 160, 180, or 220 can provide software or other data usable by other portions of IC 10. For example, this additional software and/or data may help operate the processor portion 20 of IC 10. As an even more specific example, this software and/or data may be used in decompressing and/or decrypting the PLD configuration data.

Commonly assigned, concurrently filed U.S. patent application Ser. No. 09/879,397 shows that ICs like IC 10 can have more than one independently configurable and operable PLD portion or region. All the principles of the present invention are equally applicable to ICs of the type shown in that reference (which is hereby incorporated by reference herein in its entirety).

An alternative term for "configuring" a PLD is "programming" the PLD, and hence "reprogramming" is an alternative term for "reconfiguring." Although the term "reconfiguring" a PLD is sometimes used herein to refer to situations in which the configuration of an already-configured PLD is changed, the different terms "configuration" and "reconfiguration" are used for the most part just to help the reader appreciate that a sequence of events may have occurred. Technically, reconfiguration may involve few or no differences from configuration, and so reconfiguration may also be referred to as configuration if a sequence of configuration events is of no importance. The word "supply" is sometimes used as an alternative to the word "source" (as in "data source" or "data supply").

The invention claimed is:

1. An integrated circuit comprising:
   programmable logic circuitry fabricated on a single integrated circuit chip;

circuitry fabricated on the single integrated circuit chip configured to initiate a connection between the integrated circuit and an external source of data for configuring the programmable logic circuitry;

wherein the circuitry configured to initiate the connection comprises:

circuitry configured to configure the programmable logic circuitry to function as communications port circuitry.

2. The integrated circuit defined in claim 1 wherein the circuitry configured to initiate a connection comprises:

hard-wired communications port circuitry.

3. The integrated circuit defined in claim 2 wherein the hard-wired communications port circuitry is configured to direct the connection to any of a plurality of external sources of data for configuring the programmable logic circuitry.

4. The integrated circuit defined in claim 2 wherein the hard-wired communications port circuitry comprises:

UART circuitry.

5. The integrated circuit defined in claim 1 wherein, when the programmable logic circuitry is configured to function as communications port circuitry, it is configured to direct the connection to any of a plurality of external sources of data for configuring the programmable logic circuitry.

6. The integrated circuit defined in claim 1 wherein the circuitry configured to configure the programmable logic circuitry to function as communications port circuitry comprises:

non-volatile memory circuitry configured to store data usable to configure the programmable logic circuitry to function as communications port circuitry.

7. The integrated circuit defined in claim 1 wherein the circuitry configured to configure the programmable logic circuitry to function as communications port circuitry comprises:

circuitry configured to connect the integrated circuit to an external source of data usable to configure the programmable logic circuitry to function as communications port circuitry.

8. The integrated circuit defined in claim 7 wherein the circuitry configured to connect the integrated circuit to an external source of data usable to configure the programmable logic circuitry to function as communications port circuitry comprises:

hard-wired communications port circuitry.

9. The integrated circuit defined in claim 8 wherein the hard-wired communications port circuitry is configured to direct the connection to any of a plurality of external sources of data for configuring the programmable logic circuitry.

10. The integrated circuit defined in claim 8 wherein the hard-wired communications port circuitry comprises:

UART circuitry.

11. The integrated circuit defined in claim 1 wherein the circuitry configured to initiate a connection comprises:

microprocessor circuitry.

12. The integrated circuitry defined in claim 11 wherein the circuitry configured to initiate a connection further comprises:

non-volatile memory circuitry configured to store software for booting operation of the microprocessor circuitry.

13. The integrated circuit defined in claim 1 further comprising:

re-writable memory circuitry configured to store data received from the external source.

14. The integrated circuit defined in claim 13 further comprising:

microprocessor circuitry configured to modify data stored in the re-writable memory circuitry for use in configuring the programmable logic circuitry.

15. The integrated circuit defined in claim 14 wherein the microprocessor circuitry is configured to decompress the data stored in the re-writable memory circuitry.

16. The integrated circuit defined in claim 14 wherein the microprocessor circuitry is configured to decrypt the data stored in the re-writable memory circuitry.

17. A digital processing system comprising:

processing circuitry;

a memory coupled to the processing circuitry; and an integrated circuit as defined in claim 1 coupled to the processing circuitry and the memory.

18. A printed circuit board on which is mounted an integrated circuit as defined in claim 1.

19. The printed circuit board defined in claim 18 further comprising:

a memory mounted on the printed circuit board and coupled to the integrated circuit.

20. The printed circuit board defined in claim 18 further comprising:

processing circuitry mounted on the printed circuit board and coupled to the integrated circuit.

21. A method of operating a single integrated circuit chip that includes programmable logic circuitry and control circuitry comprising:

operating the control circuitry to establish a connection between the integrated circuit chip and an external source of data for use in configuring the programmable logic circuitry;

using the connection to allow the integrated circuit chip to receive the data;

using the data to configure the programmable logic circuitry;

wherein the operating comprises:

configuring the programmable logic circuitry to function as communications port circuitry; and controlling the programmable logic circuitry to establish the connection via the programmable logic circuitry functioning as communications port circuitry.

22. The method defined in claim 21 wherein the operating comprises:

selecting the external source from a plurality of external sources; and using the control circuitry to establish the connection to the external source selected in the selecting.

23. The method defined in claim 21 wherein the operating comprises:

retrieving booting software for the control circuitry from a booting software source.

24. The method defined in claim 21 wherein the data is received in compressed form and wherein the using the data to configure the programmable logic circuitry comprises:

storing the compressed-form data in re-writable memory circuitry which is part of the integrated circuit; and further operating the control circuitry to decompress the compressed-form data for use in configuring the programmable logic circuitry.

25. The method defined in claim 21 wherein the data is received in encrypted form and wherein the using the data to configure the programmable logic circuitry comprises:

storing the encrypted-form data in re-writable memory circuitry which is part of the integrated circuit; and further operating the control circuitry to decrypt the encrypted-form data for use in configuring the programmable logic circuitry.

26. The method defined in claim 21 wherein the operating comprises:

controlling hard-wired communications port circuitry which is part of the integrated circuit to establish the connection via the hard-wired communications port circuitry.

27. The method defined in claim 26 wherein the configuring comprises:

retrieving data for configuring the programmable logic circuitry to function as communications port circuitry from non-volatile memory circuitry which is part of the integrated circuit; and installing the data for configuring the programmable logic circuitry to function as communications port circuitry in the programmable logic circuitry.

28. The method defined in claim 22 wherein the configuring comprises:

retrieving data for configuring the programmable logic circuitry to function as communications port circuitry from an external supply of such data; and installing the data thus retrieved in the programmable logic circuitry.

29. The method defined in claim 28 wherein the retrieving comprises:

selecting the external supply from a plurality of external supplies; and using the control circuitry to establish a connection to the external supply selected in the selecting.

30. The method defined in claim 28 wherein the retrieving comprises:

controlling hard-wired communications port circuitry which is part of the integrated circuit to establish a connection to the external supply via the hard-wired communications port.

31. The method defined in claim 28 wherein the data retrieved in the retrieving is in compressed form, and wherein the installing comprises:

storing the compressed-form data in re-writable memory circuitry which is part of the integrated circuit; and further operating the control circuitry to decompress the compressed-form data for installation in the programmable logic circuitry.

32. The method defined in claim 28 wherein the data retrieved in the retrieving is in encrypted form, and wherein the installing comprises:

storing the encrypted-form data in re-writable memory circuitry which is part of the integrated circuit; and further operating the control circuitry to decrypt the encrypted-form data for installation in the programmable logic circuitry.

33. The method defined in claim 21 further comprising:

further operating the control circuitry to establish a further connection between the integrated circuit and an external supply of further data for use in differently configuring the programmable logic circuitry;

using the further connection to allow the integrated circuit to receive the further data; and using the further data to differently configure the programmable logic circuitry.

34. The method defined in claim 33 wherein the further operating comprises:

selecting the external supply from a plurality of external supplies; and using the control circuitry to establish the connection to the external supply selected in the selecting.

35. An integrated circuit comprising:

programmable logic circuitry fabricated on a single integrated circuit chip;

dedicated communications port circuitry fabricated on the single integrated circuit chip;

processor circuitry fabricated on the single integrated circuit chip configured to control the dedicated communications port circuitry to make a connection to an external source of data and to cause the integrated circuit to receive the data via the connection for use in configuring the programmable logic circuitry;

wherein the data causes the programmable logic circuitry to be configured as further communications port circuitry, and wherein the processor circuitry is further configured to control the further communications port circuitry to make a further connection to an external supply of further data and to cause the integrated circuit to receive the further data via the further connection for use in further configuring the programmable logic circuitry.

36. The integrated circuit defined in claim 35 further comprising:

non-volatile memory circuitry configured to store software for booting operation of the processor circuitry.

37. The integrated circuit defined in claim 35 further comprising:

re-writable memory circuitry configured to store the data received via the connection prior to use of the data in configuring the programmable logic circuitry.

38. The integrated circuit defined in claim 35 wherein the processor circuitry is further configured to decompress the data received via the connection.

39. The integrated circuit defined in claim 35 wherein the processor circuitry is further configured to decrypt the data received via the connection.

40. The integrated circuit defined in claim 35 wherein the external source is one of a plurality of such sources, and wherein the processor circuitry is further configured to cooperate with the dedicated communications port circuitry to select any of the sources as the source to which the connection is to be made.

41. The integrated circuit defined in claim 35 wherein the external supply is one of a plurality of such supplies, and wherein the processor circuitry is still further configured to cooperate with the further communications port circuitry to select any of the supplies as the supply to which the further connection is to be made.

* * * * *